(12) United States Patent
Zhou et al.

(10) Patent No.: US 8,996,706 B2
(45) Date of Patent: Mar. 31, 2015

(54) METHOD FOR POLICY AND CHARGING RULES FUNCTION (PCRF) INFORMING CENTRALIZED DEPLOYMENT FUNCTIONAL ARCHITECTURE (BPCF) OF USER EQUIPMENT ACCESS INFORMATION

(75) Inventors: Xingyue Zhou, Shenzhen (CN); Xiaoyun Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 213 days.

(21) Appl. No.: 13/808,521

(22) PCT Filed: Jun. 22, 2011

(86) PCT No.: PCT/CN2011/076114
§ 371 (c)(1),
(2), (4) Date: Jan. 4, 2013

(87) PCT Pub. No.: WO2012/003764
PCT Pub. Date: Jan. 12, 2012

(65) Prior Publication Data
US 2013/0103846 A1    Apr. 25, 2013

(30) Foreign Application Priority Data
Jul. 6, 2010    (CN) .......................... 2010 1 0219916

(51) Int. Cl.
*G06F 15/16* (2006.01)
*H04L 29/08* (2006.01)
(Continued)

(52) U.S. Cl.
CPC ............ *H04L 67/14* (2013.01); *H04L 12/2856* (2013.01); *H04L 41/5032* (2013.01);
(Continued)

(58) Field of Classification Search
USPC ........................................ 709/228, 224, 200
See application file for complete search history.

(56) References Cited

U.S. PATENT DOCUMENTS

| | | | |
|---|---|---|---|
| 2009/0156213 A1* | 6/2009 | Spinelli et al. | 455/436 |
| 2011/0200022 A1* | 8/2011 | Annamalai | 370/338 |
| 2013/0016677 A1* | 1/2013 | Kunz et al. | 370/329 |

FOREIGN PATENT DOCUMENTS

| | | |
|---|---|---|
| CN | 101459951 A | 6/2009 |
| CN | 101534496 A | 9/2009 |

OTHER PUBLICATIONS

International Search Report for PCT/CN2011/076114 dated Sep. 15, 2011.

*Primary Examiner* — El Hadji Sall
(74) *Attorney, Agent, or Firm* — Ling Wu; Stephen Yang; Ling and Yang Intellectual Property

(57) ABSTRACT

A system and method for performing quality of service control on a user equipment are provided in the present invention. The method includes: after establishing an Internet Key Exchange version 2 (IKEv2) security association between the user equipment and a packet data network gateway to establish an Internet Protocol Security (IPSec) tunnel, the packet data network gateway sending IPSec tunnel information to a Policy and Charging Rules Function (PCRF), the PCRF then sending the IPSec tunnel information to a Broadband Policy Control Function (BPCF), and the BPCF performing quality of service control on services of the user equipment according to the received IPSec tunnel information. With the technical scheme of the present invention, it enables the BPCF to acquire tunnel information of the user equipment and then perform quality of service control on the user equipment.

6 Claims, 3 Drawing Sheets

(51) Int. Cl.
*H04L 12/28* (2006.01)
*H04L 12/24* (2006.01)
*H04L 29/06* (2006.01)
*H04M 15/00* (2006.01)
*H04W 4/24* (2009.01)
*H04L 29/12* (2006.01)
*H04W 76/02* (2009.01)

(52) U.S. Cl.
CPC ............. *H04L63/164* (2013.01); *H04M 15/66* (2013.01); *H04W 4/24* (2013.01); *H04L 41/5054* (2013.01); *H04L 41/0869* (2013.01); *H04L 61/2592* (2013.01); *H04L 61/2514* (2013.01); *H04W 76/022* (2013.01)
USPC .......................................... 709/228; 709/200

METHOD FOR POLICY AND CHARGING RULES FUNCTION (PCRF) INFORMING CENTRALIZED DEPLOYMENT FUNCTIONAL ARCHITECTURE (BPCF) OF USER EQUIPMENT ACCESS INFORMATION

TECHNICAL FIELD

The present invention relates to the field of communication, and specifically, to a system and method for performing service quality control on a user equipment.

BACKGROUND OF THE RELATED ART

In the 3rd Generation Partnership Project (3GPP) Evolved Packet System (EPS), a diagram of network architecture of the EPS in a non-roaming scenario as shown in FIG. 1 is composed of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), a Policy and Charging Rules Function (PCRF) entity and other support nodes.

An Application Function (AF) entity provides access points of service applications, and it is required to perform dynamic policy control on network resources used by these service applications. When the parameter negotiation is performed in a service plane, an AF transfers relevant service information to the PCRF entity. If the service information is identical with a policy of a PCRF, the PCRF accepts the negotiation; otherwise, the PCRF rejects the negotiation and gives service parameters which can be accepted by the PCRF in feedback at the same time. Afterwards, the AF can return these parameters to a User Equipment (UE). Wherein, an interface between the AF and the PCRF is an interface Rx.

The Policy and Charging Rules Function (PCRF) entity is a core of Policy and Charging Control (PCC), and is responsible for making policy decisions and charging rules. The PCRF provides network control rules based on service data streams, and these network controls include detection on service data streams, gating control, Quality of Service (QoS) control, and charging rules based on data streams and so on. The PCRF sends the policies and charging rules made by the PCRF to a Policy and Control Enforcement Function entity (PCEF) to perform enforcement, and meanwhile, the PCRF also needs to guarantee that these rules are identical with subscription information of a user. A basis of the PCRF making the policies and charging rules includes: acquiring information related to the services from the AF; acquiring subscription information of policy and charging control of the user from a Subscription Profile Repository (SPR); and acquiring information of networks related to bearer from the PCEF.

The Policy and Control Enforcement Function (PCEF) entity is generally located in a Gate-Way (GW), and executes the policies and charging rules made by the PCRF in a bearer plane. The PCEF detects the service data streams according to a service data stream filter in the rules sent by the PCRF, thereby executing the policies and charging rules made by the PCRF to these service data streams. When a bearer is established, the PCEF performs QoS authorization according to the rules sent by the PCRF, and performs gating control according to the enforcement of the AF. According to the charging rules sent by the PCRF, the PCEF executes a charging operation for a corresponding service data stream, and the charging can be online charging, and also can be offline charging. If it is the online charging, the PCEF needs to perform credit management together with an Online Charging System (OCS). When it is the offline charging, relevant charging information is exchanged between the PCEF and an Offline Charging System (OFCS). An interface between the PCEF and the PCRF is an interface Gx, an interface between the PCEF and the OCS is an interface Gy, and an interface between the PCEF and the OFCS is an interface Gz. The PCEF is generally located in the gateway of the network, such as a GPRS Gateway Support Node (GGSN) in a General Packet Radio Service (GPRS) and a Packet Data Gateway (PDG) in an Interworking Wireless Local Area Network (I-WLAN).

Similar to an architecture function of the PCC, a Broadband Forum (BBF) raises a Broadband Policy Control Function (Centralized Deployment Functional Architecture), and a major function of the BPCF is to make corresponding policies; Policy Enforcement Point (PEF) is generally resident in a fixed network transmission equipment such as a Broadband Remote Access Server (BRAS)/Broadband Network Gateway (BNG), and enforcement is performed according to the corresponding policies made by the BPCF; an Authentication, Authorization and Accounting (AAA) server stores user subscription information. The AF makes policies for the BPCF, and provides corresponding service information. Currently, an architecture of the BPCF is comparatively rough, and relevant details are still being further formulated.

At present, a Fixed Mobile Convergence (FMC) scenario to which many operators pay attention is mainly to study an interconnection between the 3GPP and the BBF. With regard to a scenario of the user accessing a mobile core network through a BBF fixed network, it is required to guarantee the QoS of the entire transmission path of data (the data will be transmitted through a fixed network and a mobile network). In the existing technology, an interface S9* (between the PCRF and the BPCF) is adopted for completion. In order to operate the services better, mobile operators expand wireless coverage, and considering from a cost-saving perspective, they will rent a line of WLAN access of fixed network operators. When the UE is connected to a wireless core network through a fixed network access system, the network will decide whether the fixed network access system is a trusted access network or an untrusted access network in an access authentication process. The actual deployment may have two situations.

1. The UE accesses a Residential Gateway (RG) through a Wireless Fidelity Access Point (WiFi AP), and accesses the Broadband Remote Access Server (BRAS)/Broadband Network Gateway (BNG) through an Access Note (AN) such as a Digital Subscriber Line Access Multiplexer (DSLAM), at the point, an Internet Protocol (IP) address of the UE is allocated by the RG, and an IP address of the RG is allocated by the BRAS/BNG. In order to save address space, the address allocated to the UE may be a private address, the RG is required to perform Network Address Translation (NAT) to the IP address of the UE in this case, and messages transmitted between the UE and HA need to be encapsulated through a User Datagram Protocol (UDP).

2. The UE performs access through the WiFi AP and accesses the BRAS/BNG through the AN, and the IP address of the UE is allocated by the BRAS/BNG at the point. Similarly, in order to save the address space, the IP address allocated by the BRAS/BNG to the UE or RG may also be a private IP address, the BRAS/BNG also performs NAT to the IP address of the UE at the point, and the messages transmitted between the UE and the HA need to be encapsulated through the UDP.

When the UE is connected to the wireless core network through a trusted access system of the fixed network operators, two interface modes of S2a and S2c can be adopted to perform connection. The interface S2a is based on a mobility management protocol Proxy Mobile IP Version 6 (PMIPv6), the UE must perform access authentication to the trusted access system; the interface S2c is based on a mobility management protocol Dual-Stack Mobile IP Version 6 (DSMIPv6), and when the UE is connected to the wireless core network through the access system of the fixed network operators at the interface S2c, the UE can directly perform authentication and authorization to the AAA server at the wireless core network side. In this case, the trusted access system of the fixed network operators can't know tunnel information of the UE, and thus the BPCF is unable to perform QoS guarantee to the data, passing through the fixed network access system, of the UE.

SUMMARY OF THE INVENTION

The present invention provides a system and method for performing Quality of Service (QoS) control on a User Equipment (UE), which enables a Broadband Policy Control Function (BPCF) in the above situation to acquire tunnel information of the UE, thereby performing QoS control on the UE.

A method for performing quality of service control on a user equipment comprises:

after establishing an Internet Key Exchange version 2 (IKEv2) security association between the user equipment and a packet data network gateway to establish an Internet Protocol Security (IPSec) tunnel, the packet data network gateway sending IPSec tunnel information to a Policy and Charging Rules Function (PCRF), the PCRF then sending the IPSec tunnel information to Broadband Policy Control Function (BPCF), and the BPCF executing a service quality control procedure on services of the user equipment according to received IPSec tunnel information.

Alternatively, the tunnel information comprises a local IP address of the user equipment;

the step of the BPCF executing a service quality control procedure on services of the user equipment according to received IPSec tunnel information comprises: the BPCF executing the service quality control procedure on part or all of services using the local IP address in the user equipment according to the local IP address.

Alternatively, if a packet sent by the user equipment is translated by Network Address Translation (NAT) when passing through a Broadband Forum (BBF) access system, the IPSec tunnel information further comprises a User Datagram Protocol (UDP) source port number of the packet sent by the user equipment which has been translated by the NAT;

if the packet data network gateway receives a binding update message containing an original IP address of the user equipment, the IPSec tunnel information further comprises the original IP address of the user equipment; and the step of the BPCF executing the service quality control procedure on services of the user equipment according to received IPSec tunnel information further comprises: the BPCF executing the service quality control procedure on all or part of services using the original IP address.

Alternatively, a network element which plays a function of NAT to translate the packet sent by the user equipment is a broadband remote access server or a residential gateway.

Alternatively, the PCRF sends the IPSec tunnel information of the user equipment to the BPCF during a procedure of an S9* session establishment which is initiated by the BPCF.

The present invention further provides a system for performing quality of service control on a user equipment, which comprises: a packet data network gateway, a PCRF and a BPCF; wherein:

the packet data network gateway is configured to: after establishing an IKEv2 security association with the user equipment to establish an IPSec tunnel, send IPSec tunnel information to the PCRF;

the PCRF is configured to send received IPSec tunnel information to the BPCF; and the BPCF is configured to execute a service quality control procedure on services of the user equipment according to the received IPSec tunnel information.

Alternatively, the tunnel information comprises a local IP address of the user equipment;

the BPCF is configured to execute the service quality control procedure on services of the user equipment in the following way: executing the service quality control procedure on part or all of services using the local IP address in the user equipment according to the local IP address.

Alternatively, if a packet sent by the user equipment is translated by NAT when passing through a Broadband Forum (BBF) access system, the IPSec tunnel information further comprises a User Datagram Protocol (UDP) source port number of the packet sent by the user equipment which has been translated by the NAT;

if the packet data network gateway receives a binding update message containing an original IP address of the user equipment, the IPSec tunnel information further comprises the original IP address of the user equipment; and the BPCF is further configured to execute the service quality control procedure on services of the user equipment in the following way: executing the service quality control procedure on all or part of services using the original IP address.

Alternatively, a network element which plays a function of NAT to translate the packet sent by the user equipment is a broadband remote access server or a residential gateway.

Alternatively, the PCRF is configured to send access information of the user equipment to the BPCF during a procedure of an S9* session establishment which is initiated by the BPCF.

In conclusion, the present invention provides a system and method for performing QoS control on the UE, which can implement that the BPCF obtains the tunnel information of the UE and performs QoS control.

PREFERRED EMBODIMENTS OF THE PRESENT INVENTION

With respect to the problem in the above situation, the present invention provides a method which enables a Broadband Policy Control Function (BPCF) to acquire tunnel information of a User Equipment (UE).

The present example provides a system for performing Quality of Service (QoS) control on the UE, which comprises: a Packet Data Network Gateway (PDN GW), a Policy and Charging Rules Function (PCRF) and the BPCF;

the PDN GW is configured to: after establishing an IKEv2 security association with the UE to establish an IPSec tunnel, send IPSec tunnel information to the PCRF;

the PCRF is configured to: send the received IPSec tunnel information to the BPCF; and the BPCF is configured to: perform QoS control on services of the UE according to the received IPSec tunnel information.

Preferably, the IPSec tunnel information sent by the PDN GW to the PCRF includes a local IP address of the UE;

the BPCF performing QoS control on the services of the UE refers to the BPCF performing QoS control on part or all of services using the local IP address in the UE according to the above local IP address.

If a packet is translated by NAT when passing through a BBF access system, the IPSec tunnel information also includes a UDP source port number of the packet sent by the user equipment which has been translated by NAT;

if the PDN GW receives a binding update message containing an original IP address (i.e. an IP address before the translation) of the UE, the IPSec tunnel information sent by the PDN GW to the PCRF also includes the original IP address of the UE; and the BPCF performing QoS control on the services of the UE also includes the BPCF performing QoS control on all or part of services using the original IP address.

A network element performing IP address translation to the packet is a BRAS or an RG.

The PCRF sends access information of the UE to the BPCF in a process of an S9* session establishment which is initiated by the BPCF.

The example provides a method for performing QoS control on the user equipment, and the PDN GW sends the access information of the user equipment to the PCRF after obtaining the access information of the user equipment, and the PCRF then sends the access information of the user equipment to the BPCF, and the BPCF performs QoS control on the user equipment according to the received tunnel information.

EXAMPLE 1

Figure 1:
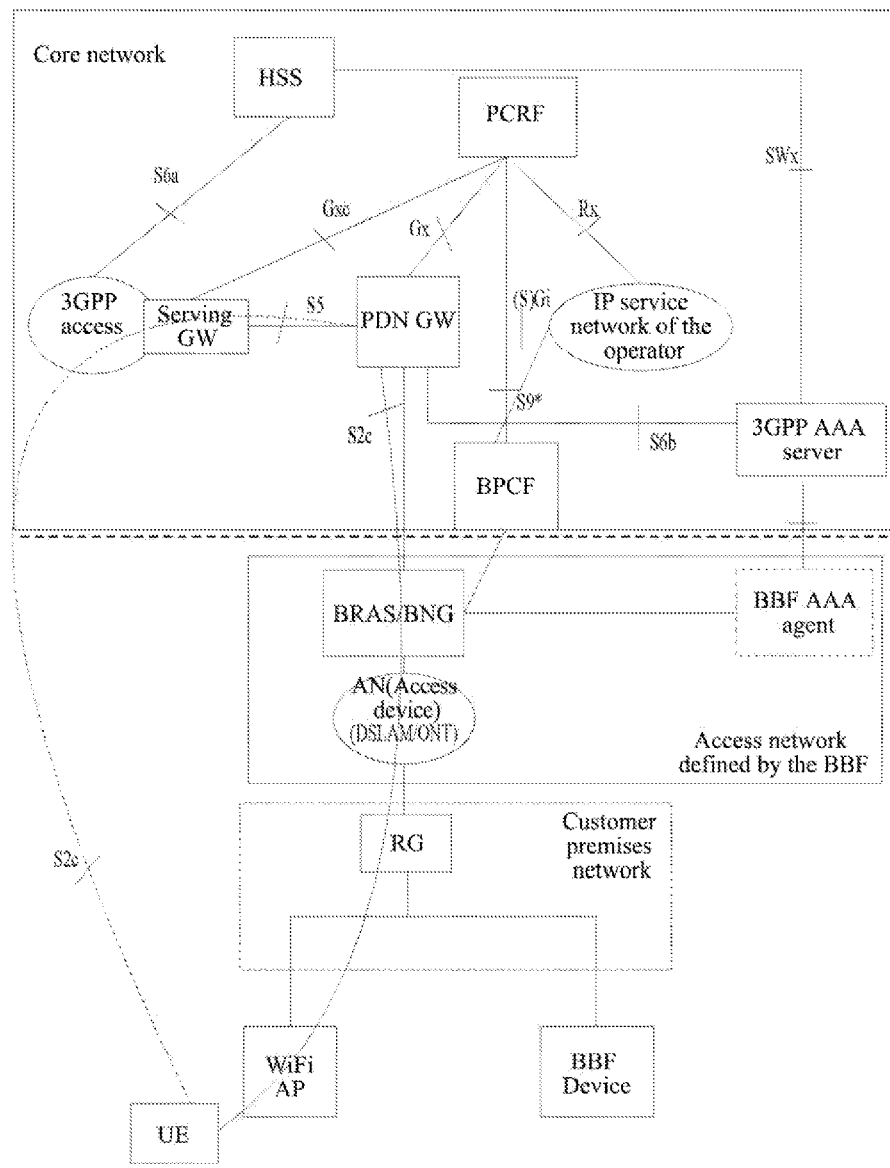
FIG. 1 is an architecture diagram of a UE being connected to a wireless core network through a trusted BBF access network based on an interface S2c in a non-roaming scenario.
Figure 2:
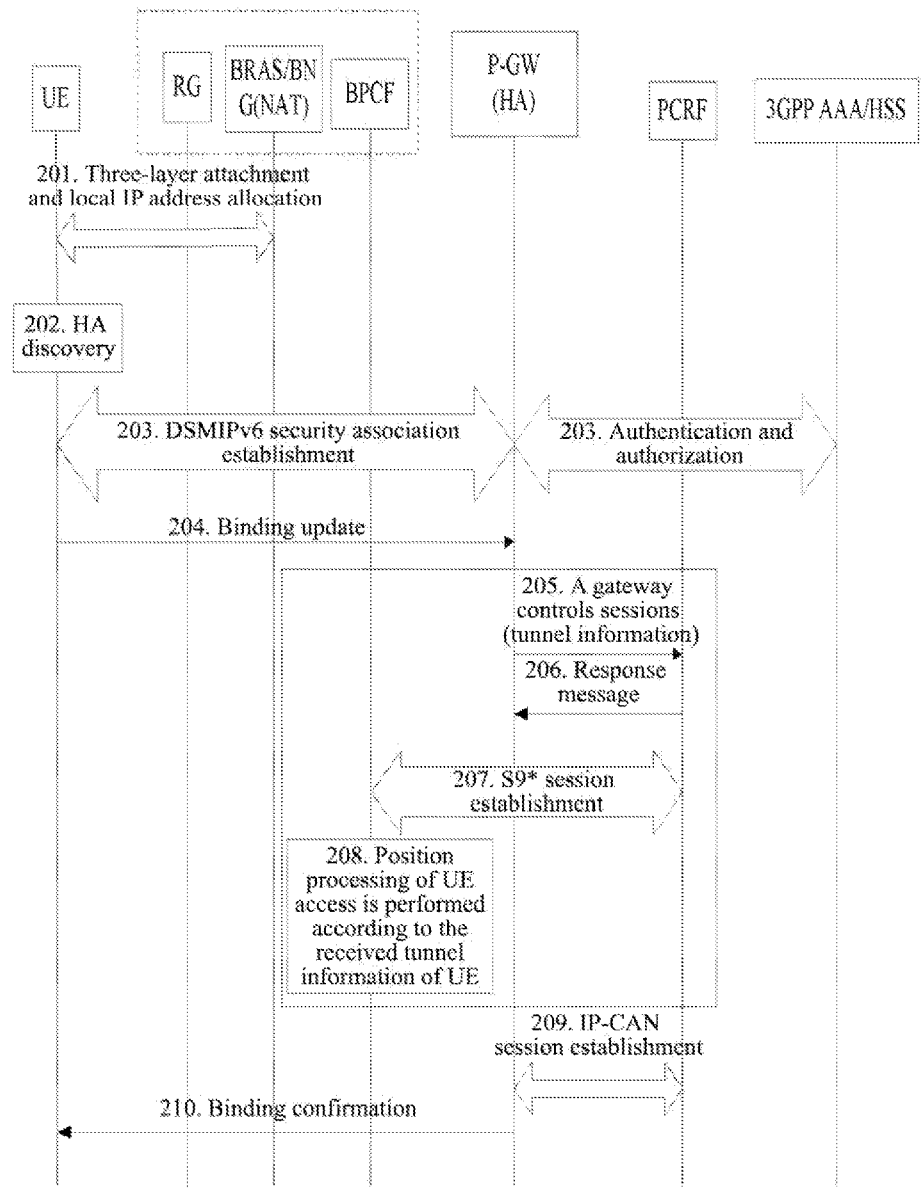
FIG. 2 is a flow diagram of a UE initially attaching to an access network through a BBF fixed network access system based on an interface S2c according to the example 1 of the present invention.

A UE accessing a BBF customer premises network and an access network through a WiFi AP based on an interface S2c to initially attach to a wireless access network is as shown in FIG. 2. A local IP address of the UE is allocated by a BRAS, and in the process of the UE performing initial attachment based on DSMIPv6, a PCRF informs a BPCF of access information of the UE. In order to save address space, what the BRAS allocates to the UE is a private IP address, NAT will be performed on an IP packet in the BRAS (the local IP address of the UE is seen from a perspective of network side, and if what the BRAS allocates to the UE is the private IP address, the local IP address refers to a public IP address translated from the private IP address). Here, it is noted that there is no limitation to the sequence of the messages reaching the HA in steps 205~208 and in step 204, that is, step 205 can be initiated as long as a PDN GW acquires access information of the UE needed. The specific flow steps are described as follows.

In step 201, the UE establishes a three-layer connection, and the local IP address allocated to the UE serves as a Care-of Address of the DSMIPv6.

In step 202, the UE executes a home agent discovery function to acquire an IP address or a FQDN of the home agent (PDN GW).

In step 203, the UE initiates a DSMIPv6 security association establishment to the PDN GW so as to protect a DSMIPv6 signaling, and the PDN GW performs authentication and authorization to 3GPP AAA/HSS in this process.

In step 204, the UE sends a DSMIPv6 binding update message to the HA (PDN GW) for performing DSMIPv6 routing binding.

In step 205, after completing the security association and the authentication and authorization, the PDN GW sends IPSec tunnel information to the PCRF, and the IPSec tunnel information may include but not limited to the IP address and a UDP source port number after the packet passes through a BBF access system.

If the IP address of the packet is translated when the packet passes through the BBF access system, the above IP address after passing through the BBF access system is a translated IP address.

In the example, a network element which plays the function of NAT to the packet is the BRAS.

If the PDN GW receives a binding update message and the binding update message contains an original IP address of the UE, the IPSec tunnel information sent by the PDN GW also can include the original IP address, namely an address before the NAT, allocated by the BRAS to the UE.

In step 206, the PCRF returns a response message of the message in step 205 to the PDN GW.

In step 207, the PCRF initiates an S9* session establishment to the BPCF, and sends the received IPSec tunnel information to the BPCF in this process.

The IPSec tunnel information may include but not limited to the IP address and the UDP source port number of the packet after passing through the BBF access system;

if the IP address of the packet is translated when the packet passes through the BBF access system, the above IP address after passing through the BBF access system is the translated IP address; and if the PDN GW sends the original IP address of the UE to the PCRF, the PCRF also can send the original IP address of the UE to the BPCF.

In step 208, the BPCF positions data stream (a path from the BRAS to a core network) of the UE in the current BBF access system according to IP address information of the UE, and performs QoS control on services of the UE.

Specifically, the BPCF performs QoS control on part or all of services using the IP address after passing through the BBF access system; if the BPCF acquires the original IP address of the UE at the same time, the BPCF can further perform QoS control on part or all of services using the original IP address.

In step 209, an IP-CAN session is established between the PDN GW and PCRF.

In step 210, the HA (PDN GW) sends a binding confirmation message of the DSMIPv6 to the UE.

EXAMPLE 2

Figure 3:
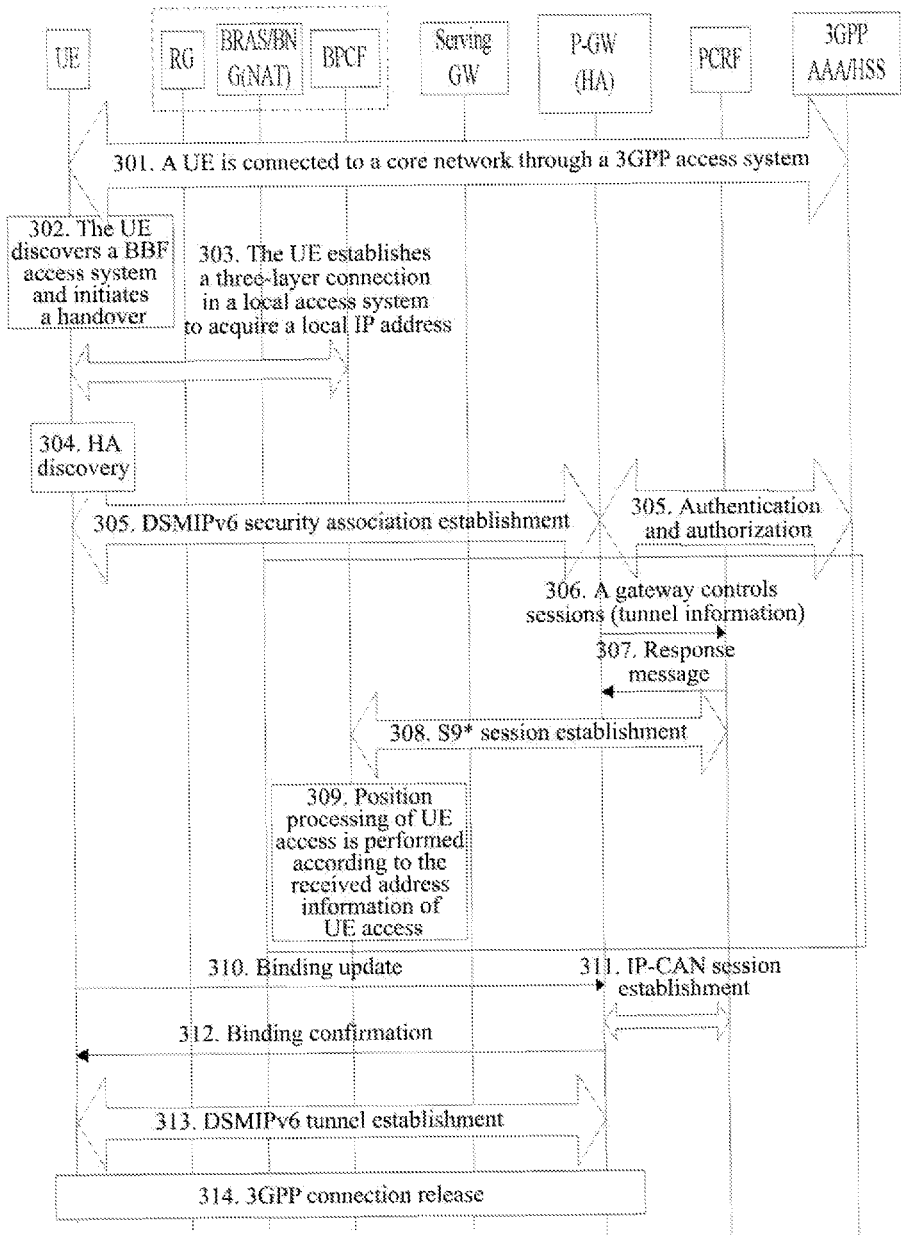
FIG. 3 is a flow diagram of a UE performing handover from a 3GPP access system to a BBF access system on an interface S2c according to the example 2 of the present invention.

A UE performing handover from a 3GPP access network to a BBF access system is as shown in FIG. 3. A local IP address of the UE is allocated by an RG, in order to save address space, what the RG allocates to the UE is a private IP address, and NAT will be performed on an IP packet in the RG (the local IP address of the UE is seen from a perspective of network side, and if what the RG allocates to the UE is the private IP address, the local IP address refers to a public IP address translated from the private IP address). Here, it is noted that there is no limitation to the sequence of the messages reaching the HA in steps 306~309 and in step 310, that is, step 306 can be initiated as long as a PDN GW acquires access information of the UE needed. The specific flow steps are described as follows.

In step 301, the UE establishes an EPS bearer connection through a 3GPP access system.

In step 302, the UE discovers the BBF access system and prepares to switch the current connection to the BBF access system.

In step 303, the UE establishes a three-layer connection, and the local IP address allocated to the UE serves as a Care-of Address of DSMIPv6.

In step 304, the UE executes a home agent discovery function to acquire an IP address or a FQDN of the home agent (PDN GW).

In step 305, the UE initiates a DSMIPv6 security association establishment to the PDN GW so as to protect a DSMIPv6 signaling, and the PDN GW performs authentication and authorization to 3GPP AAA/HSS in this process.

In step 306, after completing the security association and the authentication and authorization, the PDN GW (HA) sends IPSec tunnel information to a PCRF, and the IPSec tunnel information may include but not limited to the IP address and UDP source port number of the packet after passing through the BBF access system.

If the IP address of the packet is translated when the packet passes through the BBF access system, the above IP address after passing through the BBF access system is a translated IP address.

In the example, a network element performing NAT to the IP address is the RG.

In step 307, the PCRF returns a response message of the message in step 306 to the PDN GW.

In step 308, the PCRF initiates an S9* session establishment to a BPCF, and sends the received IPSec tunnel information to the BPCF in this process.

The IPSec tunnel information may include but not limited to the IP address and the UDP source port number of the packet after passing through the BBF access system;

if the IP address of the packet is translated when the packet passes through the BBF access system, the above IP address after passing through the BBF access system is the translated IP address; preferably, if the PDN GW sends an original IP address of the UE to the PCRF, the PCRF also can send the original IP address of the UE to the BPCF.

In step 309, the BPCF positions data stream (a path from the RG to a core network) of the UE in the current BBF access system according to IP address information of the UE, and performs QoS control on services of the UE.

Specifically, the BPCF performs QoS control on part or all of services using the IP address after passing through the BBF access system; if the BPCF acquires the original IP address of the UE at the same time, the BPCF can further perform QoS control on part or all of services using the original IP address.

In step 310, the UE sends a binding update message of the DSMIPv6 to the HA (PDN GW).

In step 311, an IP-CAN session is established between the HA (PDN GW) and PCRF.

In step 312, the HA (PDN GW) sends a binding confirmation message of the DSMIPv6 to the UE.

In step 313, a DSMIPv6 tunnel establishment between the UE and HA is finished.

In step 314, the handover is completed, and bearer resources accessed through the 3GPP before the handover are released.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

INDUSTRIAL APPLICABILITY

With the present invention, it can be implemented that the BPCF obtains the tunnel information of the UE and performs QoS control.

What is claimed is:

1. A method for performing quality of service control on a user equipment, comprising:
    after establishing an Internet Key Exchange version 2 (IKEv2) security association between the user equipment and a packet data network gateway to establish an Internet Protocol Security (IPSec) tunnel, the packet data network gateway sending IPSec tunnel information to a Policy and Charging Rules Function (PCRF), then the PCRF sending the IPSec tunnel information to Broadband Policy Control Function (BPCF), and the BPCF executing a service quality control procedure on services of the user equipment according to the received IPSec tunnel information;
    wherein the IPSec tunnel information comprises a local IP address of the user equipment;
    the step of the BPCF executing a service quality control procedure on services of the user equipment according to the received IPSec tunnel information comprises: the BPCF executing the service quality control procedure on part or all of services using the local IP address in the user equipment according to the local IP address;
    if a packet sent by the user equipment is translated by NAT (Network Address Translation) when passing through a Broadband Forum (BBF) access system, the IPSec tunnel information further comprises a User Datagram Protocol (UDP) source port number of the packet sent by the user equipment which has been translated by the NAT;
    if the packet data network gateway receives a binding update message containing an original IP address of the user equipment, the IPSec tunnel information further comprises the original IP address of the user equipment; and
    the step of the BPCF executing a service quality control procedure on services of the user equipment according to the received IPSec tunnel information further comprises: the BPCF performing quality of service control on all or part of services using the original IP address.

2. The method according to claim 1, wherein:
    a network element which plays a function of NAT to translate the packet sent by the user equipment is a broadband remote access server or a residential gateway.

3. The method according to claim 1, wherein:
    the PCRF sends the IPSec tunnel information of the user equipment to the BPCF during a procedure of an S9* session establishment which is initiated by the BPCF;
    wherein S9* is an interface between the PCRF and the BPCF.

4. A system for performing quality of service control on a user equipment, comprising: a packet data network gateway, a Policy and Charging Rules Function (PCRF) and a Broadband Policy Control Function (BPCF); wherein:

the packet data network gateway is configured to send IPSec tunnel information to the PCRF after establishing an Internet Key Exchange version 2 (IKEv2) security association with the user equipment to establish an Internet Protocol Security (IPSec) tunnel;

the PCRF is configured to send the received IPSec tunnel information to the BPCF; and the BPCF is configured to execute a service quality control procedure on services of the user equipment according to the received IPSec tunnel information;

wherein the IPSec tunnel information comprises a local IP address of the user equipment;

the BPCF is configured to execute the service quality control procedure on services of the user equipment in a following way: executing the service quality control procedure on part or all of services using the local IP address in the user equipment according to the local IP address;

if a packet sent by the user equipment is translated by NAT (Network Address Translation) when passing through a Broadband Forum (BBF) access system, the local IP address is a translated IP address;

if a packet sent by the user equipment is translated by NAT when passing through a Broadband Forum (BBF) access system, the IPSec tunnel information further comprises a User Datagram Protocol (UDP) source port number of the packet sent by the user equipment which has been translated by the NAT;

if the packet data network gateway receives a binding update message containing an original IP address of the user equipment, the IPSec tunnel information further comprises the original IP address of the user equipment; and the BPCF is further configured to execute the service quality control procedure on services of the user equipment in a following way: executing the service quality control procedure on all or part of services using the original IP address.

5. The system according to claim 4, wherein:

a network element which plays a function of NAT to translate the packet sent by the user equipment is a broadband remote access server or a residential gateway.

6. The system according to claim 4, wherein:

the PCRF is configured to send access information of the user equipment to the BPCF during a procedure of an S9* session establishment which is initiated by the BPCF;

wherein S9* is an interface between the PCRF and the BPCF.

* * * * *